United States Patent
Yu et al.

(10) Patent No.: US 7,813,330 B2
(45) Date of Patent: Oct. 12, 2010

(54) GAP FILLER APPARATUS AND METHOD FOR PROVIDING CYCLIC DELAY DIVERSITY IN A DIGITAL MULTIMEDIA BROADCASTING SYSTEM, AND BROADCASTING RELAY NETWORK USING THE SAME

(75) Inventors: Hyun-Seok Yu, Seoul (KR); Hyun-Seok Oh, Incheon (KR); Ji-Won Ha, Seoul (KR); Min-Goo Kim, Yungin-si (KR)

(73) Assignee: Samsung Electronics Co., Ltd (KR)

( * ) Notice: Subject to any disclaimer, the term of this patent is extended or adjusted under 35 U.S.C. 154(b) by 1278 days.

(21) Appl. No.: 11/293,638

(22) Filed: Dec. 2, 2005

(65) Prior Publication Data

US 2006/0120271 A1 Jun. 8, 2006

(30) Foreign Application Priority Data

Dec. 3, 2004 (KR) ................ 10-2004-0101454

(51) Int. Cl.
*H04B 7/216* (2006.01)
(52) U.S. Cl. .............. 370/342; 370/203; 370/208; 370/310; 370/312; 370/343
(58) Field of Classification Search ........... 370/203, 370/208, 310, 312, 342, 343, 206, 328, 331, 370/338, 344, 347, 335, 517; 375/260, 261, 375/267, 222, 228, 141
See application file for complete search history.

(56) References Cited

U.S. PATENT DOCUMENTS

| | | | |
|---|---|---|---|
| 6,580,705 B1 * | 6/2003 | Riazi et al. .............. 370/347 |
| 6,693,984 B1 * | 2/2004 | Andre .................... 375/350 |
| 6,785,513 B1 * | 8/2004 | Sivaprakasam ........... 455/63.1 |
| 7,002,934 B2 * | 2/2006 | Dolgonos et al. ......... 370/328 |
| 2002/0147978 A1 * | 10/2002 | Dolgonos et al. ............. 725/62 |
| 2002/0154705 A1 * | 10/2002 | Walton et al. ............ 375/267 |
| 2004/0151255 A1 * | 8/2004 | Riazi et al. ............. 375/260 |
| 2004/0156428 A1 * | 8/2004 | Miyashita .............. 375/211 |
| 2004/0165650 A1 * | 8/2004 | Miyazaki et al. ........ 375/141 |
| 2005/0014464 A1 * | 1/2005 | Larsson ................ 455/11.1 |
| 2005/0058104 A1 * | 3/2005 | Yomo et al. ............ 370/335 |
| 2005/0059342 A1 * | 3/2005 | Engels et al. ............ 455/7 |
| 2005/0190830 A1 * | 9/2005 | Miyashita et al. ........ 375/228 |
| 2005/0259567 A1 * | 11/2005 | Webster et al. .......... 370/208 |
| 2005/0286620 A1 * | 12/2005 | Peng .................... 375/222 |
| 2006/0013186 A1 * | 1/2006 | Agrawal et al. .......... 370/344 |
| 2006/0109925 A1 * | 5/2006 | Kannan et al. .......... 375/260 |
| 2007/0066220 A1 * | 3/2007 | Proctor et al. .......... 455/11.1 |
| 2009/0180564 A1 * | 7/2009 | Celebi et al. ........... 375/260 |

* cited by examiner

*Primary Examiner*—Aung S Moe
*Assistant Examiner*—Abdullah Riyami
(74) *Attorney, Agent, or Firm*—The Farrell Law Firm, LLP (57) ABSTRACT

A gap filler apparatus providing cyclic delay diversity in a digital multimedia broadcasting (DMB) system. In the gap filler apparatus, a receiver receives an orthogonal frequency division multiplexing (OFDM) signal transmitted as a broadcasting signal. A symbol synchronization unit acquires symbol synchronization of the OFDM signal, detects a guard interval of an OFDM symbol using the symbol synchronization, determines a sample length, by which the OFDM symbol is cyclic-delayed within the guard interval, and cyclic-delays the OFDM signal by the determined sample length. An amplifier amplifies the cyclic-delayed OFDM signal. A transmitter transmits the amplified OFDM signal to a wireless network.

15 Claims, 10 Drawing Sheets

FIG.1

(PRIOR ART)

FIG.2

(PRIOR ART)

GAP FILLER APPARATUS AND METHOD FOR PROVIDING CYCLIC DELAY DIVERSITY IN A DIGITAL MULTIMEDIA BROADCASTING SYSTEM, AND BROADCASTING RELAY NETWORK USING THE SAME

PRIORITY

This application claims the benefit under 35 U.S.C. §119 (a) of an application entitled "Gap Filler Apparatus and Method for Providing Cyclic Delay Diversity in a Digital Multimedia Broadcasting System, and Broadcasting Relay Network Using the Same" filed in the Korean Intellectual Property Office on Dec. 3, 2004 and assigned Serial No. 2004-101454, the entire contents of which are hereby incorporated by reference.

BACKGROUND OF THE INVENTION

1. Field of the Invention

The present invention relates generally to an apparatus and method for providing Digital Multimedia Broadcasting (DMB) service, and in particular, to a gap filler apparatus and method for providing DMB service using cyclic delay diversity.

2. Description of the Related Art

DMB service is the next generation digital broadcasting service in which subscribers can enjoy high-quality, multi-channel multimedia broadcasting. Generally, DMB service is provided to subscribers through a portable terminal or a vehicle-mounted terminal (hereinafter simply referred to as a "terminal"), and can also be provided through a computer equipped with a DMB receiver. DMB service can transmit CD-level high-quality multimedia streams via a wireless network even at a moving velocity of 200 Km/h, and can be classified into satellite DMB service and terrestrial DMB service according to transmission medium used.

Herein, satellite DMB service refers to service for providing digital broadcasting using a satellite and gap fillers installed in the ground, and terrestrial DMB service refers to service for providing digital broadcasting through the gap fillers. Terrestrial DMB service is technology provided by adding Motion Picture Experts Group-4 (MPEG-4) source coding also in order to transmit a moving image based on European Research Coordination Agency project-147 (Eureka 147), which is a standard for a European Digital Audio Broadcasting (DAB) system, and it is expected that terrestrial DMB service will be popularized in the near future.

Unlike the general cellular network, a broadcasting network is preferably featured by a single-frequency network (SFN). Therefore, in the broadcasting network, one terminal receives signals in the same frequency band transmitted from a plurality of gap fillers at regular intervals. Because terrestrial DMB service uses Orthogonal Frequency Division Multiplexing (OFDM) as a transmission scheme, if time intervals between the gap fillers fall within a guard interval of an OFDM symbol, they can be regarded as multiple paths of a general wireless fading channel. However, if a time interval between multipath signals generated by a delay exceeds a length of the guard interval, it may undesirably lead to inter-symbol interference (ISI) and inter-carrier interference (ICI).

Figure 1:
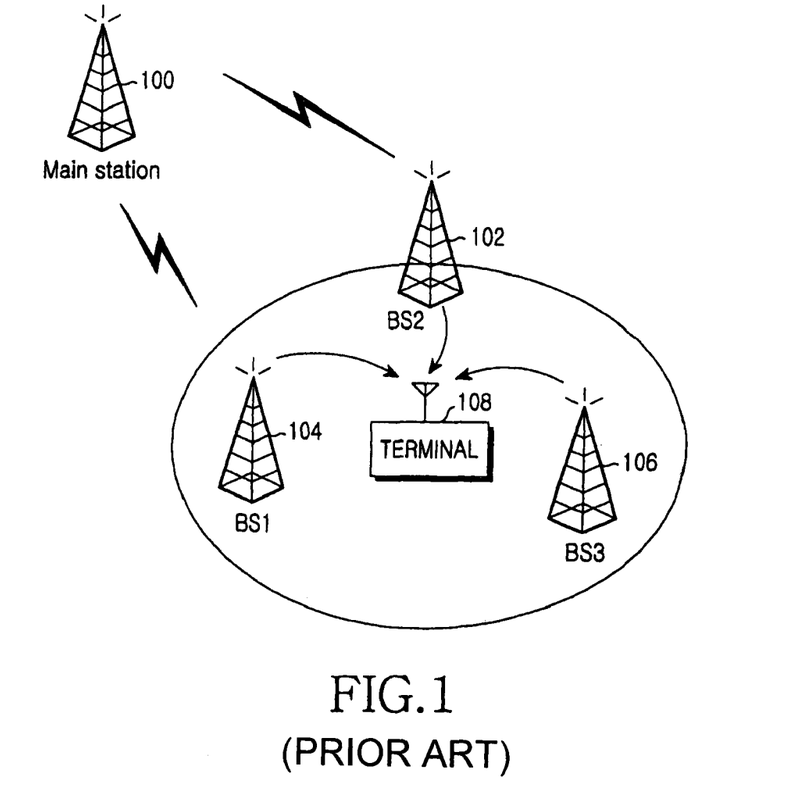
FIG. 1 is a diagram illustrating a conventional single-frequency network (SFN)

FIG. 1 is a diagram illustrating a configuration of a conventional SFN. In FIG. 1, a plurality of gap fillers 102, 104, and 106 amplify the intact broadcasting signals transmitted from a main station 100 and retransmit the amplified broadcasting signals to a terminal 108. That is, the gap fillers 102, 104, and 106 simply serve to compensate for a power loss due to a path loss.

Figure 2:
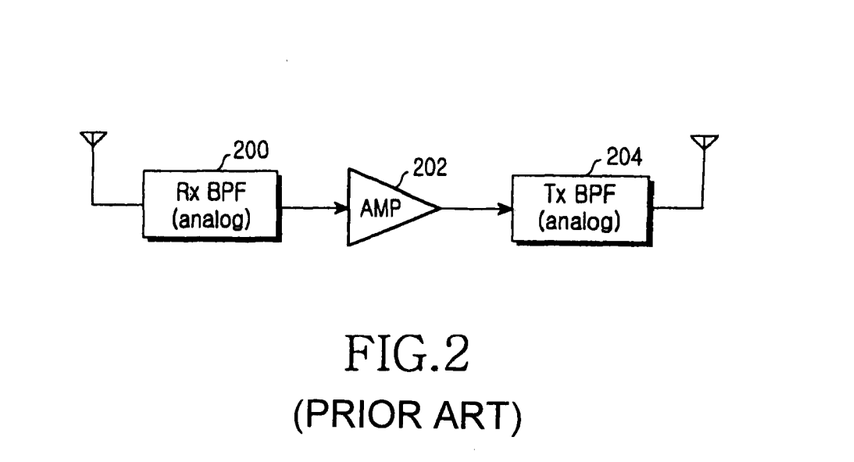
FIG. 2 is a diagram illustrating a conventional gap filler.

FIG. 2 is a diagram illustrating an internal structure of a conventional gap filler. The conventional gap filler simply performs analog filtering through a reception band-pass filter (Rx BPF) 200 and a transmission band-pass filter (Tx BPF) 204 without demodulation and decoding operations, and simply performs signal amplification using an amplifier 202. In such a gap filler, because there is almost no time delay caused by signal processing, such as demodulation or decoding, signals transmitted from multiple gap fillers to a terminal have time differences corresponding to the distances between the terminal and the gap fillers.

Generally, a Coded-OFDM (COFDM) system shows better performance as frequency selectivity of a channel is higher, i.e., as a coherence bandwidth is narrower, because when the frequency selectivity is low, a reception signal may suffer from considerable attenuation due to fading at a certain time. However, when the frequency selectivity is high, reception signals are uniform to some extent in terms of the total power, and although there are many nulls at a particular frequency, they can be compensated for by forward error correction, thereby improving performance.

In order for a terminal to increase the frequency selectivity for reception performance improvement, the number of multiple paths of a fading channel should increase. Therefore, it is preferable to provide as many paths as possible, as long as they fall within the guard interval. In particular, when a terminal is located in a position where it secures a line of sight (LOS) because it is adjacent to a transmitter or has a less number of obstacles between the terminal and the transmitter, the terminal may have a fewer signal paths. However, a terminal located in such a position is susceptible to fading. Therefore, in order to guarantee reception performance on an appropriate level, the terminal must transmit signals with unnecessarily high power.

In order to address these problems, a cellular OFDM system has introduced a method in which each base station creates effective channels with multipath channels using a cyclic delay for transmission signals. In multiple transmission antennas of a base station a codeword sequence ($X_0, X_1, \ldots, X_{N-1}$) with a block length N is modulated with N subcarriers. Signals OFDM-modulated by Inverse Discrete Fourier Transform (IDFT) are given by Equation (1):

$$x_n = \frac{1}{\sqrt{N}} \sum_{k=0}^{N-1} X_k e^{j2\pi kn/N}, n = 0, 1, \ldots, N-1 \qquad (1)$$

The signals are inserted into a time-domain sequence $\{x_n\}$ on the assumption that a length G of a cyclic guard interval is equal to the number M of antennas (G=M). Then, the results are shown in Equation (2):

$$\tilde{x}_{(n+G)_{N+G}} = x_{(n)_N}, n=0,1,\ldots,N+G-1 \qquad (2)$$

where $(n)_N$ denotes a residual obtained by dividing n by N.

Figure 3:
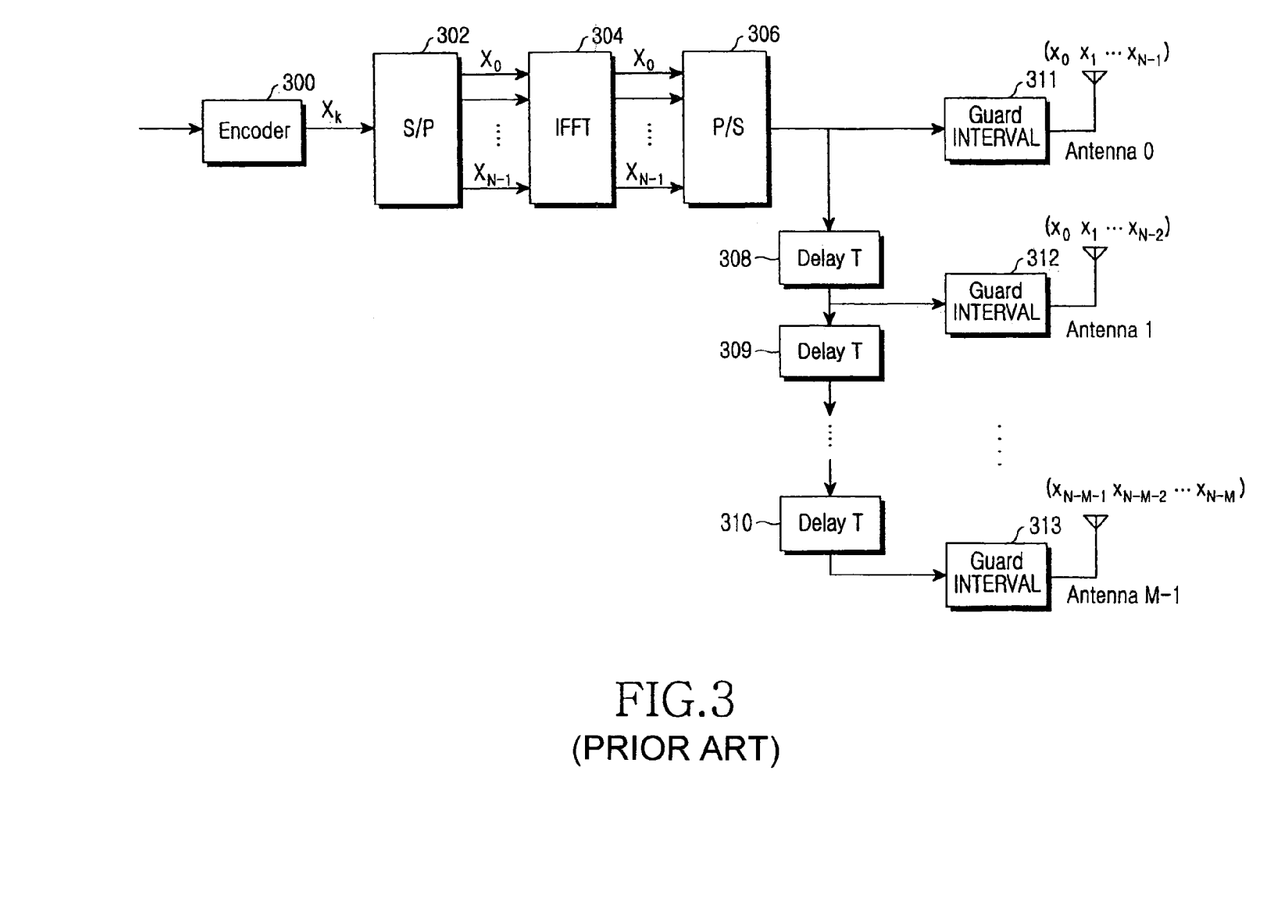
FIG. 3 is a block diagram illustrating a transmitter for performing a basic cyclic delay diversity modulation scheme using multiple carriers in a conventional DMB system.

FIG. 3 is a block diagram illustrating a transmitter for performing basic cyclic delay diversity modulation using multiple carriers in a conventional DMB system. In the transmitter of FIG. 3, a transmission signal is input to an encoder 300. The encoder 300 encodes the transmission signal and outputs the coded transmission signal to a serial-to-parallel (S/P) converter 302. The S/P converter 302 converts the coded transmission signal into parallel signals, and outputs the parallel signals to an Inverse Fast Fourier Transform (IFFT) unit 304. The IFFT unit 304 modulates the parallel signals with N subcarriers, and outputs the IFFT-modulated signals to a parallel-to-serial (P/S) converter 306. The P/S converter 306 converts the IFFT-modulated signals into a serial signal. A codeword sequence $(X_0, X_1, \ldots, X_{N-1})$ with a block length N of the serial signal is delayed by each of delays 308, 309, and 310 by a delay interval T, and transmitted to a wireless network via M transmission antennas. The signals transmitted to the wireless network via M transmission antennas have a tapped delay line structure with a length M−1.

The delay interval is equal to a symbol interval T of the time-domain sequence $\{x_n\}$. In this case, the codeword C is given by Equation (3).

$$C = \begin{pmatrix} x_0 & x_1 & \ldots & x_{N-1} \\ x_{N-1} & x_0 & \ldots & x_{N-2} \\ \vdots & \vdots & \ddots & \vdots \\ x_{N-M+1} & x_{N-M+2} & \ldots & x_{N-M} \end{pmatrix} \quad (3)$$

Referring to Equation (3), in FIG. 3, an $M^{th}$ transmission antenna #(M−1) transmits a sequence $(x_{N-m}, x_{N-m+1}, \ldots, x_{N-m-1})$ obtained by cyclic-shifting a sequence $(x_0, x_1, \ldots, x_{N-1})$ of a first transmission antenna #0 by a symbol interval T, M times. The codeword C defined in Equation (3) is called a cyclic delay codeword.

A base station or a mobile terminal using multiple antennas can obtain additional frequency diversity gain by cyclic-delaying OFDM signals for the individual antennas by a predetermined interval before transmission, using the cyclic delay diversity modulation scheme.

Assuming that an OFDM signal $x_n$ is transmitted via M antennas, a time interval of the OFDM signal $x_n$ is denoted by T, a maximum time delay in a frequency selective fading channel is denoted by $\tau_{max}T$, energy of the OFDM signal is denoted by $E_s$ and a channel response is denoted by $h_n$, a received signal $y_n$ is defined as shown in Equation (4).

$$y_n = \sqrt{E_s}\, x_n * h_n = \sqrt{E_s} \sum_{l=-\infty}^{\infty} h_l x_{n-l} = \sqrt{E_s} \sum_{l=0}^{\tau_{max}-1} h_l x_{n-l} \quad (4)$$

In the cyclic delay diversity modulation scheme, a guard interval of the OFDM signal is set to $\tau_{G1}T$. Preferably, the guard interval should be set longer than the maximum time delay $\tau_{max}T$ of the OFDM signal. The guard interval $\tau_{G1}T$ of the OFDM signal, which is set longer than the maximum time delay $\tau_{max}T$, can be expressed as in Equation (5).

$$\tau_{G1}T \geq \max(MT, \tau_{max}T) \quad (5)$$

Assuming that antennas of the transmitter are individually independent of antennas of a receiver and in Equation (4), a channel impulse response between an $l^{th}$ transmission antenna and a reception antenna is denoted by $h_n^l$, there is no channel impulse response after the maximum time delay of the OFDM signal.

If a frequency response for a channel received at a reception antenna from an $l^{th}$ transmission antenna is denoted by $H_k^l$, an effective channel in a frequency domain at the receiver can be represented by Equation (6).

$$H_k = \sum_{l=0}^{M-1} H_k^l e^{-j2\pi kl/N} \quad (6)$$

That is, the cyclic delay diversity modulation scheme of FIG. 3 converts an effective channel from a flat fading channel to a multipath fading channel from the standpoint of the receiver.

Fading gain obtainable by delaying an OFDM signal before transmitting it via different antennas can be equivalent to fading gain obtainable from different paths in a multipath channel. Herein, the cyclic delay diversity modulation scheme will be extended not only to a multiantenna environment but also to a cellular environment. That is, it is assumed that different cyclic delays are given even for the transmission signals transmitted from individual base stations.

Figure 4:
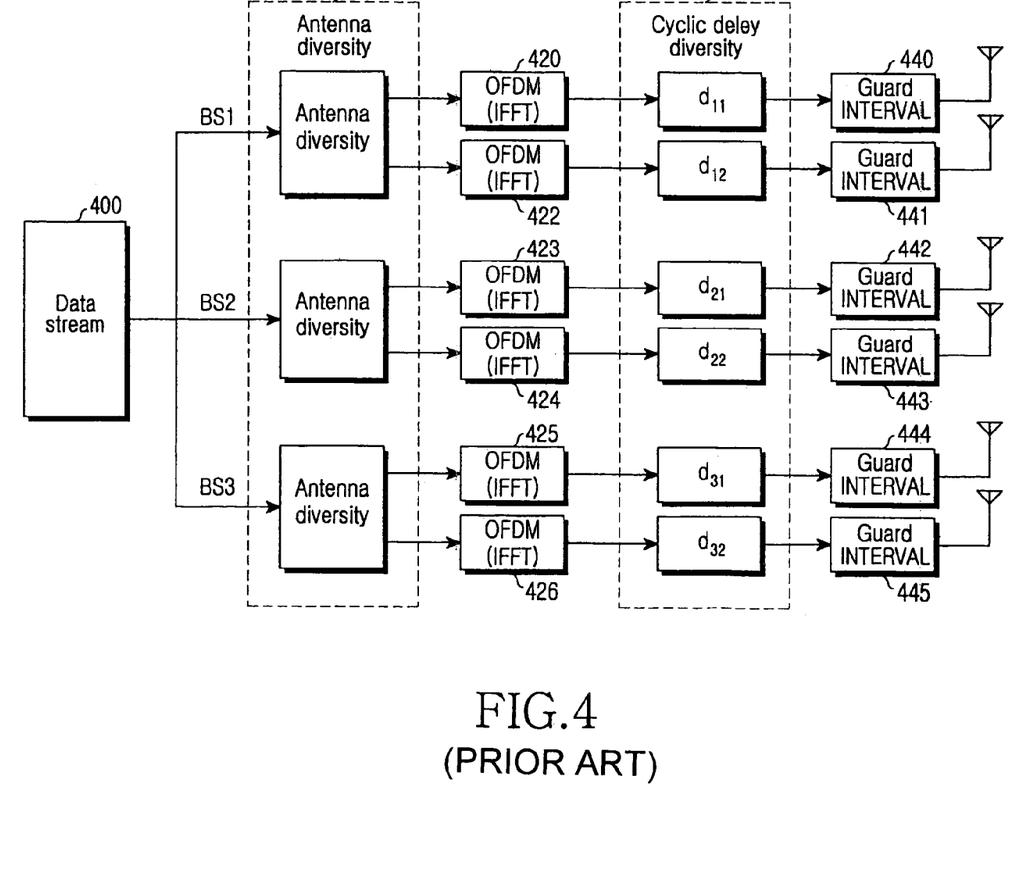
FIG. 4 is a block diagram illustrating a system for applying a cyclic delay diversity modulation scheme for transmission signals transmitted from individual base stations.

FIG. 4 is a block diagram illustrating a system for applying a cyclic delay diversity modulation scheme for transmission signals transmitted from individual base stations. Referring to FIG. 4, each of base stations BS1, BS2, and BS3 includes a plurality of transmission antennas. The base stations BS1, BS2, and BS3 simultaneously transmit the same data stream 400. Each base station can obtain macro diversity by applying an appropriate cyclic delay through a cyclic delay diversity unit 430. Each base station can obtain antenna diversity either for its own antennas or for the total antennas. The latter case may cause an increase in complexity of a receiver.

Figure 5:
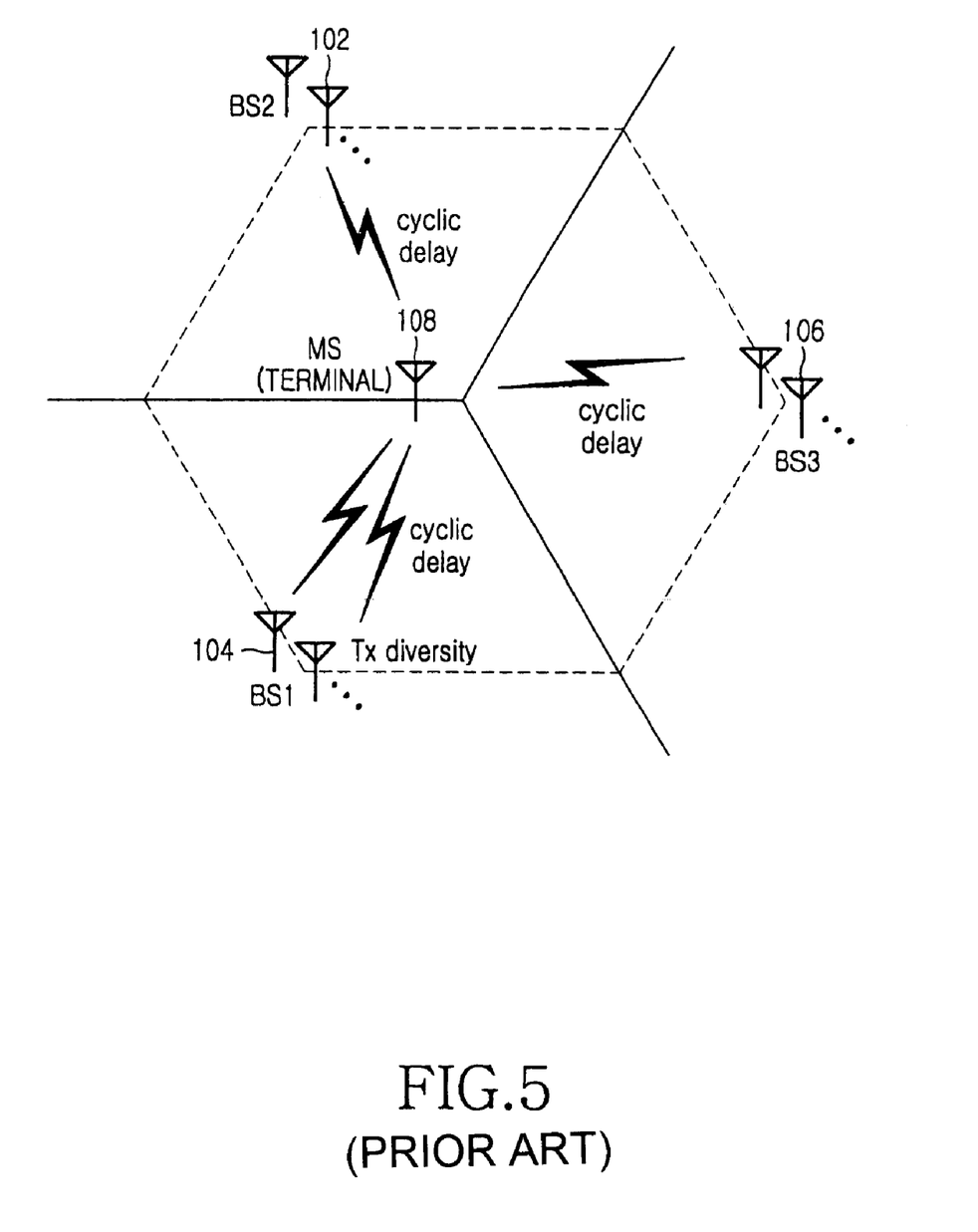
FIG. 5 is a diagram illustrating a combination of antenna diversity and cyclic delay diversity in a conventional cellular environment.

FIG. 5 is a diagram illustrating a combination of antenna diversity and cyclic delay diversity in a conventional cellular environment. As illustrated in FIG. 5, a terminal 108 can obtain antenna diversity either from base stations 102, 104, and 106, or from the total antennas.

The broadcasting service is most disadvantageous in that a reception capability of the terminal is low in the blanket area. If a gap filler applies cyclic delay diversity using the characteristics of an OFDM signal, it is possible to obtain additional frequency diversity gain, contributing to possible performance improvement. That is, each base station in the cellular environment illustrated in FIG. 5, under the control of its upper layer of a base station controller, can adjust a cyclic delay value of an OFDM transmission signal and can also process digital signals.

However, the terrestrial DMB system cannot apply the cyclic delay diversity taking the structure of the conventional gap filler into consideration because a gap filler for terrestrial DMB service simply amplifies signals without a separate demodulation means and retransmit the intact analog signals. Accordingly, the gap filler for terrestrial DMB service cannot apply the cyclic delay diversity.

Although there is a possible scheme in which the gap filler applies the cyclic delay diversity by demodulating a received OFDM signal, this scheme causes an excessive increase in the manufacturing cost of the gap filler. In addition, if a delay in the gap filler due to the demodulation operation exceeds the guard interval of the OFDM symbol, it serves as an interference signal, making it difficult to make the best use of the SFN.

SUMMARY OF THE INVENTION

The present invention provides a gap filler apparatus and method for providing cyclic delay diversity in a Digital Multimedia Broadcasting (DMB) system.

In addition, the present invention provides a gap filler apparatus and method capable of improving a reception capability in a blanket area in a DMB system.

Further, the present invention provides a gap filler apparatus and method capable of extending a service area of the gap filler in a DMB system.

Moreover, the present invention provides a gap filler apparatus and method capable of reducing a required number of gap fillers and reducing transmission power of a relay network in a DMB system.

Furthermore, the present invention provides a broadcasting relay network for providing cyclic delay diversity in a DMB system.

According to one aspect of the present invention, there is provided a gap filler apparatus for providing cyclic delay diversity in a digital multimedia broadcasting (DMB) system. The gap filler apparatus includes a receiver for receiving an orthogonal frequency division multiplexing (OFDM) signal transmitted as a broadcasting signal; a symbol synchronization unit for acquiring symbol synchronization of the OFDM signal, detecting a guard interval of an OFDM symbol using the symbol synchronization, determining a sample length, by which the OFDM symbol is cyclic-delayed within the guard interval, and cyclic-delaying the OFDM signal by the determined sample length; an amplifier for amplifying the cyclic-delayed OFDM signal; and a transmitter for transmitting the amplified OFDM signal to a wireless network.

According to another aspect of the present invention, there is provided a method for providing cyclic delay diversity in a gap filler for a digital multimedia broadcasting (DMB) system. The method includes the steps of: receiving an orthogonal frequency division multiplexing (OFDM) signal transmitted as a broadcasting signal; acquiring symbol synchronization of the received OFDM signal; detecting a guard interval of an OFDM symbol using the acquired symbol synchronization; determining a sample length, by which the OFDM symbol is cyclic-delayed within the guard interval; and cyclic-delaying the OFDM signal by the determined sample length.

According to further another aspect of the present invention, there is provided a broadcasting relay network including a plurality of gap fillers for transmitting a broadcasting signal to a terminal in a digital multimedia broadcasting (DMB) system. Each of the gap fillers includes a receiver for receiving an orthogonal frequency division multiplexing (OFDM) signal transmitted as the broadcasting signal; a symbol synchronization unit for acquiring symbol synchronization of the OFDM signal, detecting a guard interval of an OFDM symbol using the symbol synchronization, determining a sample length, by which the OFDM symbol is cyclic-delayed within the guard interval, and cyclic-delaying the OFDM signal by the determined sample length; an amplifier for amplifying the cyclic-delayed OFDM signal; and a transmitter for transmitting the amplified OFDM signal to a wireless network.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail herein below with reference to the annexed drawings. In the drawings, the same or similar elements are denoted by the same reference numerals even though they are depicted in different drawings. Additionally, in the following description, a detailed description of known functions and configurations incorporated herein has been omitted for clarity and conciseness.

Figure 6:
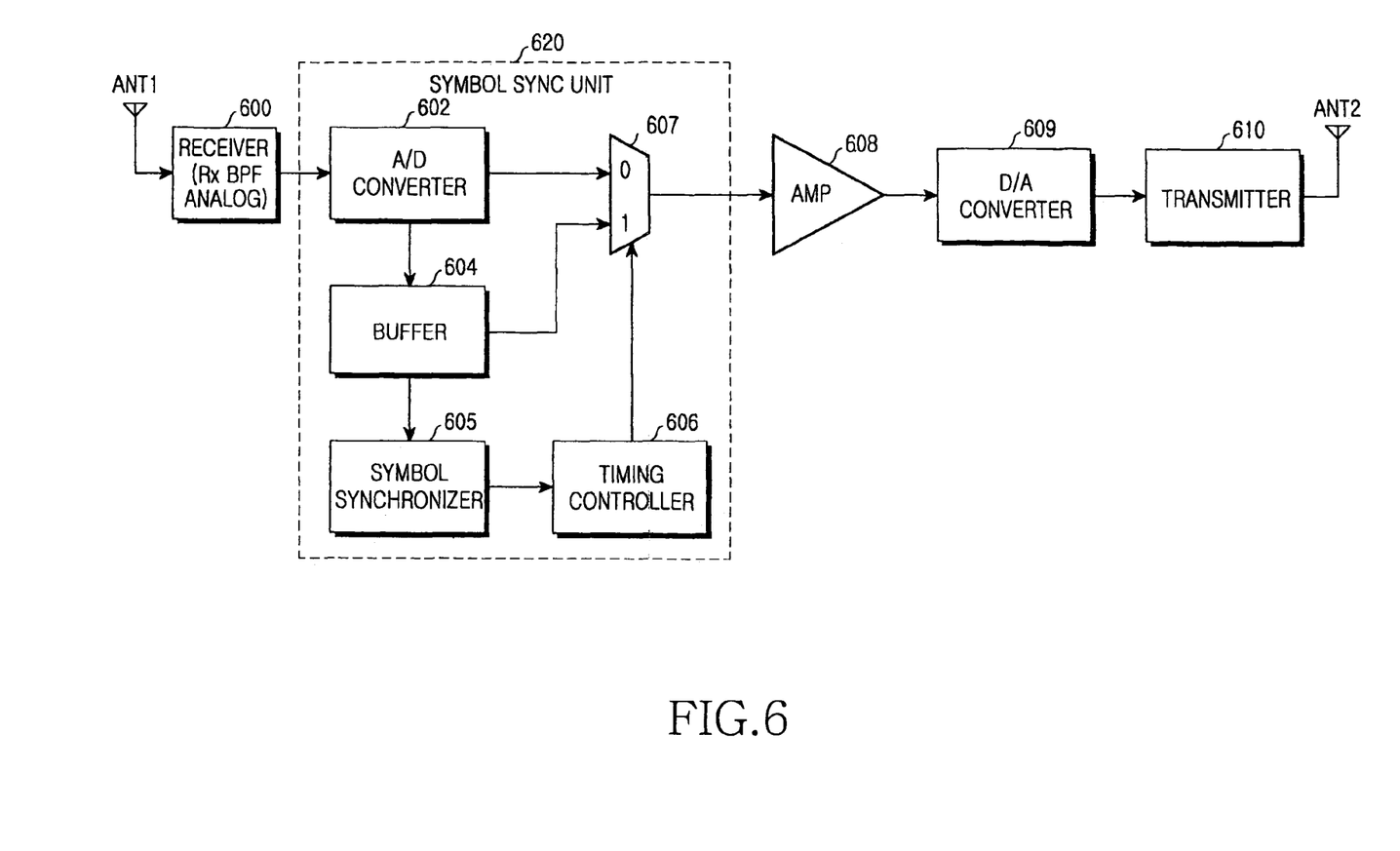
FIG. 6 is a block diagram illustrating a gap filler apparatus for providing cyclic delay diversity in a DMB system according to an embodiment of the present invention.

FIG. 6 is a block diagram illustrating a gap filler apparatus for providing cyclic delay diversity in a Digital Multimedia Broadcasting (DMB) system according to an embodiment of the present invention. Referring to FIG. 6, a gap filler for a terrestrial DMB system includes a receiver 600 for receiving an OFDM signal broadcasted from a broadcasting station (not shown) via a reception antenna ANT1, a symbol synchronization unit 620 for acquiring symbol synchronization of the received OFDM signal, detecting a guard interval of the OFDM symbol based on the acquired symbol synchronization, determining a sample length of the cyclic-delayed OFDM symbol and delaying the OFDM signal by the determined sample length, an amplifier 608 for amplifying the delayed OFDM signal, a digital-to-analog (D/A) converter 609 for converting the amplified OFDM signal into an analog signal, and a transmitter 610 for converting the analog OFDM signal into a radio frequency (RF) signal and transmitting the RF signal via a transmission antenna ANT2.

In the symbol synchronization unit 620, an analog-to-digital (A/D) converter 602 for converting the received OFDM signal into a digital signal, converts a predetermined number of initial OFDM symbols in the OFDM signal received through a receiver 600 into digital signals, and stores the digital signals in a buffer 604. A symbol synchronizer 605 acquires symbol synchronization using the samples of the OFDM signal stored in the buffer 604. Once the symbol synchronization is acquired, a Fast Fourier Transform (FFT) window for the OFDM symbols, and a start time and an end time of a guard interval are determined.

A timing controller 606 controls an operation of a multiplexer 607 for multiplexing outputs of the A/D converter 602 and the buffer 604, such that it determines a sample length of an OFDM symbol cyclic-delayed within a length of the guard interval using the acquired symbol synchronization and adds samples of the determined length to the last part of the corresponding OFDM symbol from the start time (i.e., symbol synchronization time) of every OFDM symbol output through the A/D converter 602.

The buffer 604 buffers the samples with the determined length, and a cyclic delay value of the OFDM symbol is determined depending on the sample length. The buffering operation should be continuously performed in units of sample in order to minimize a delay time. More specifically, if a cyclic delay time excessively increases to exceed the guard interval of the OFDM symbol, inter-symbol interference (ISI) occurs at a terminal receiving DMB service (hereinafter referred to as a "DMB terminal").

In this structure, an OFDM symbol obtained by applying a cyclic delay to the original OFDM symbol received from the symbol synchronization unit 620 is generated, and the cyclic-delayed OFDM symbol is transmitted to the wireless network through the amplifier 608, the D/A converter 609, and the transmitter 610.

Figure 9:
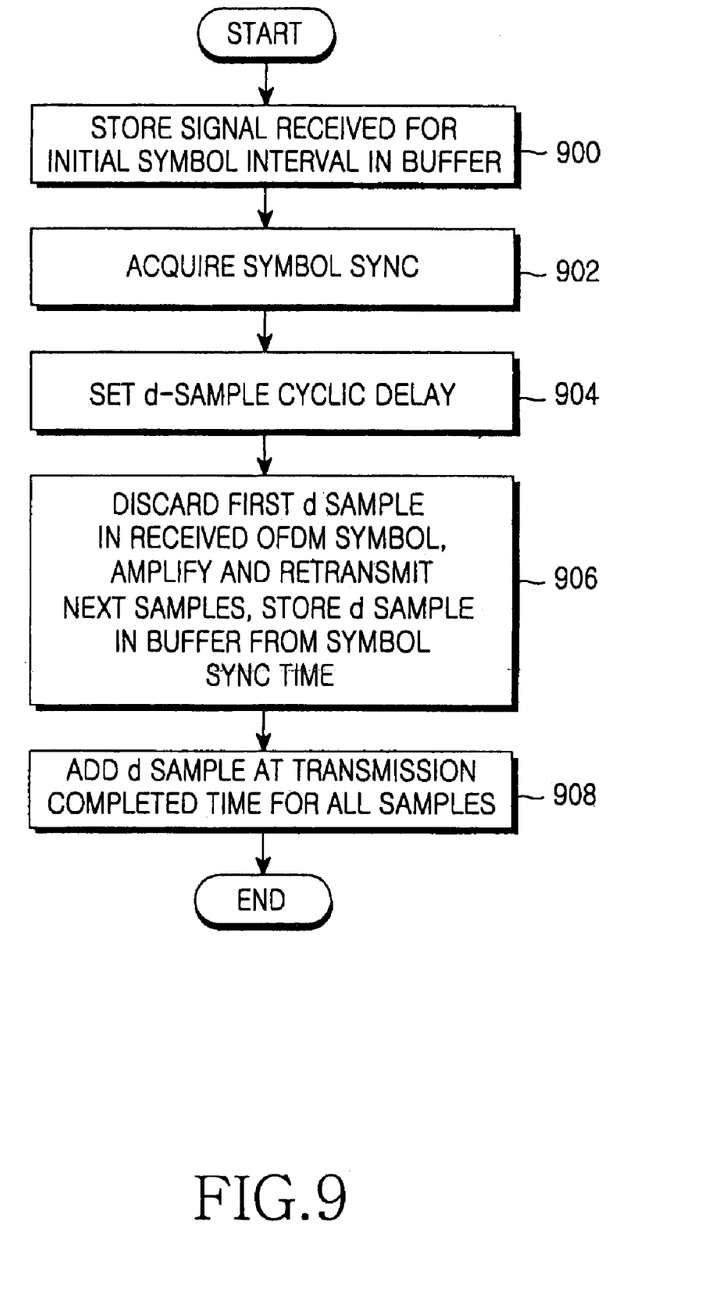
FIG. 9 is a flowchart illustrating a process of processing reception signals in order to provide cyclic delay diversity in a gap filler for a DMB system according to an embodiment of the present invention.

FIG. 9 is a flowchart illustrating a process of processing reception signals in order to provide cyclic delay diversity in a gap filler for a DMB system according to an embodiment of the present invention. Referring to FIG. 9, for a reception signal, a gap filler stores in a buffer 604 an OFDM signal received for a period of a predetermined number of initial symbols in step 900. In step 902, a symbol synchronizer 605 acquires symbol synchronization using the OFDM signal stored in the buffer 604. The symbol synchronization can be acquired using a correlator or a matched filter. Once the symbol synchronization is acquired, it is possible to determine a sample of the received OFDM signal, at which an FFT window or a guard interval starts and ends.

In step 904, a timing controller 606 sets a length of the sample, by which the OFDM signal is delayed within the guard interval. In the following description, the sample whose length is set will be referred to as a 'd' sample.

Figure 7:
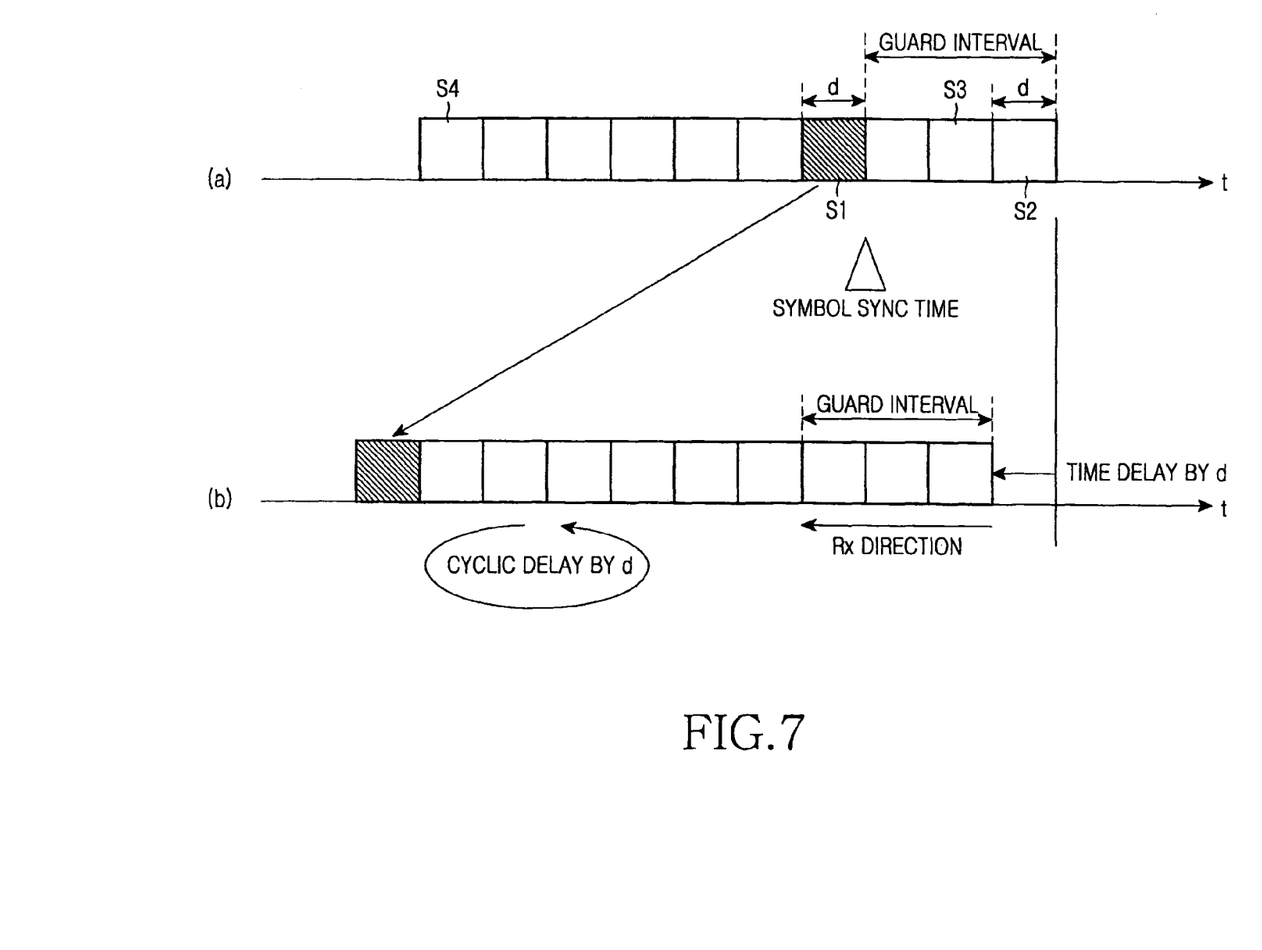
FIG. 7 is a diagram for a description of a cyclic delay for an OFDM symbol in a gap filler according to an embodiment of the present invention.

In step 906, the timing controller 606 stores an OFDM signal of a 'd' sample S1 in the buffer 604 from the symbol synchronization time (see (a) of FIG. 7) without receiving a first 'd' sample S2 in the guard interval in the process of receiving an OFDM signal as illustrated in (b) of FIG. 7 to add the 'd' sample S1 to the last part of a corresponding OFDM symbol from the symbol synchronization time of every OFDM symbol. An OFDM signal from the next 'd' sample S3 of the first 'd' sample S2 till the last 'd' sample S4 is transmitted through an A/D converter 602, a multiplexer 607, and an amplifier 608.

In step 908, the timing controller 606 adds the 'd' sample S1 stored in the buffer 604 to the last part of the corresponding OFDM symbol before transmission at the time when transmission of all samples from S3 to S4 is completed. As a result, the symbol finally transmitted from the gap filler has a format illustrated in (b) of FIG. 7.

FIG. 7 is a diagram for a description of a cyclic delay for an OFDM symbol in a gap filler according to an embodiment of the present invention. Referring to (b) of FIG. 7, a signal which is cyclic-delayed exactly by the 'd' sample is subject to processing delay by the 'd' sample before being transmitted. That is, a receiver receives an OFDM symbol that is delayed by '2d' samples.

The cyclic delay diversity implementation process described with reference to FIG. 9 will now be described in a mathematical way.

For N-point FFT and G-sample guard interval, a sequence $\{x_n\}$ can be expressed as $(x_0, x_1, x_2, \ldots, x_{N+G-2}, x_{N+G-1})$. If a receiver desires to apply a cyclic delay of '2d' samples, the sequence can be cyclic-shifted into $(x_d, x_{d+1}, x_{d+2}, \ldots, x_{N+G-2}, x_{N+G-1}, x_G, x_{G+1}, \ldots, x_{G+d-1})$. It is possible to implement cyclic delay diversity by transmitting OFDM signals having different cyclic delays from several gap fillers using the gap filler structure illustrated in FIG. 6, and it is also possible to increase reception capability in the blanket area by appropriately adjusting the cyclic delay to be given in each gap filler.

As can be appreciated from FIG. 7, in order for a receiver to obtain a cyclic delay of '2d' samples, a signal delay of a 'd' sample is actually required. In an SFN-OFDM environment, if such a delay signal is received within a guard interval, it serves as a multiple path, contributing to performance improvement. However, if the delay signal exceeds the guard interval, it causes ISI and ICI, resulting in considerable performance degradation.

Figure 8:
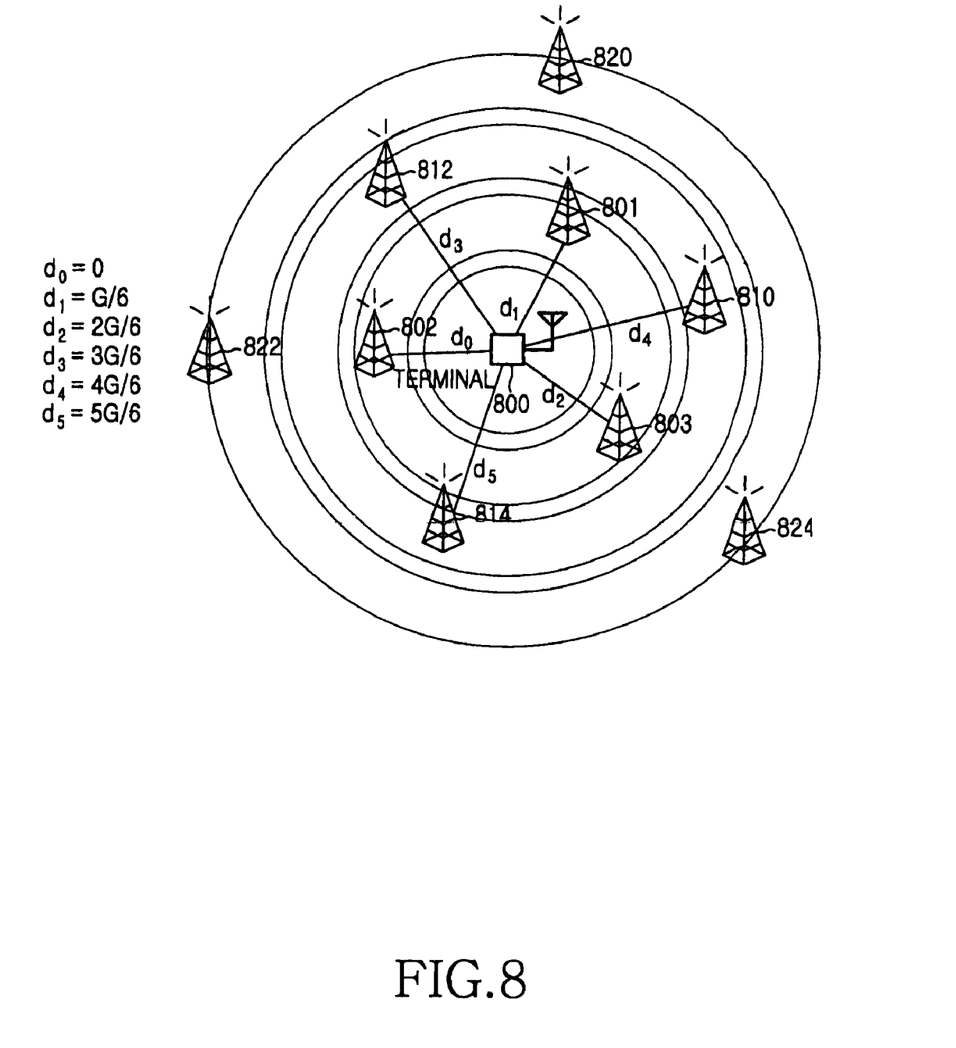
FIG. 8 is a diagram illustrating a cyclic delay design for gap filler arrangement according to an embodiment of the present invention.

Actually, therefore, the cyclic delay of gap fillers for transmitting signals having effective power for a receiver must be adjusted while taking a length of the guard interval into consideration. Neighboring gap fillers can be classified in the manner of tier-1, tier-2, tier-3,... according to power attenuation with respect to a length, as illustrated in FIG. 8. In addition, gap fillers belonging to the remaining tiers except for the tier in which even though a terminal 800, or a receiver, is added to the multiple paths it cannot contribute to performance improvement because of its high power attenuation, must satisfy a condition of Equation (7) below. It is assumed herein that the number of the gap fillers belonging to the tiers except for the tier that cannot contribute to performance improvement is K.

$$\max(\{d_k\}) - \min(\{d_k\}) \leq G \qquad (7)$$

In Equation (7), $k=1, 2, \ldots, K$, $d_k$ denotes a symbol delay of a $k^{th}$ gap filler, and G denotes a length of a guard interval.

FIG. 8 is a diagram illustrating a cyclic delay design for gap filler arrangement according to an embodiment of the present invention. It is assumed in FIG. 8 that six tier-1 and tier-2 gap fillers 801, 802, 803, 810, 812, and 814 satisfy the condition of Equation (7). It is shown that all of the six gap fillers have a cyclic delay within the guard interval and the terminal 800, or the receiver, actually has six signal paths. Actually, although there is a possible distance difference between the terminal 800 and the gap fillers, if a multipath difference caused by the distance difference is not sufficient, cyclic delay diversity (CDD) caused by the cyclic delay is useful, and if the distance difference between the terminal 800 and the gap fillers is negligible, it is possible to prevent performance degradation caused by fading by artificially making multiple paths.

Figure 10:
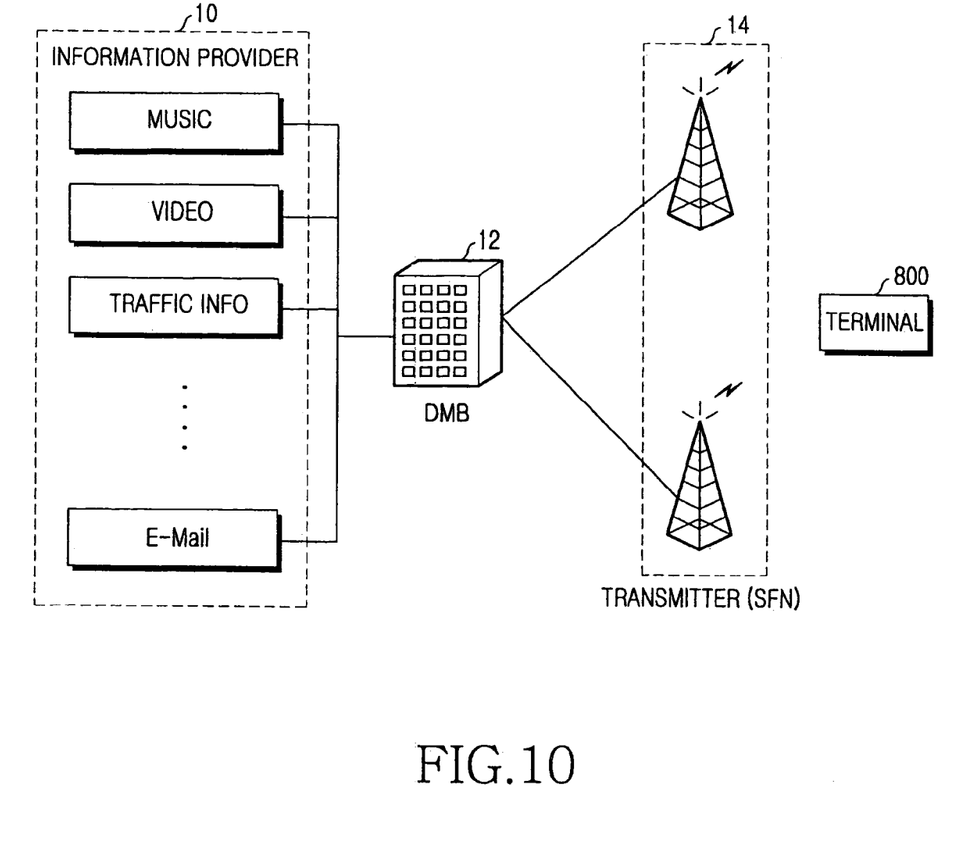
FIG. 10 is a diagram illustrating a DMB transmission network to which an embodiment of the present invention is applied.

FIG. 10 is a diagram illustrating a DMB transmission network to which an embodiment of the present invention is applied. Referring to FIG. 10, a broadcasting station 12 provides a broadcasting signal 10 to a terminal 800 through a transmitter 914.

Figure 11:
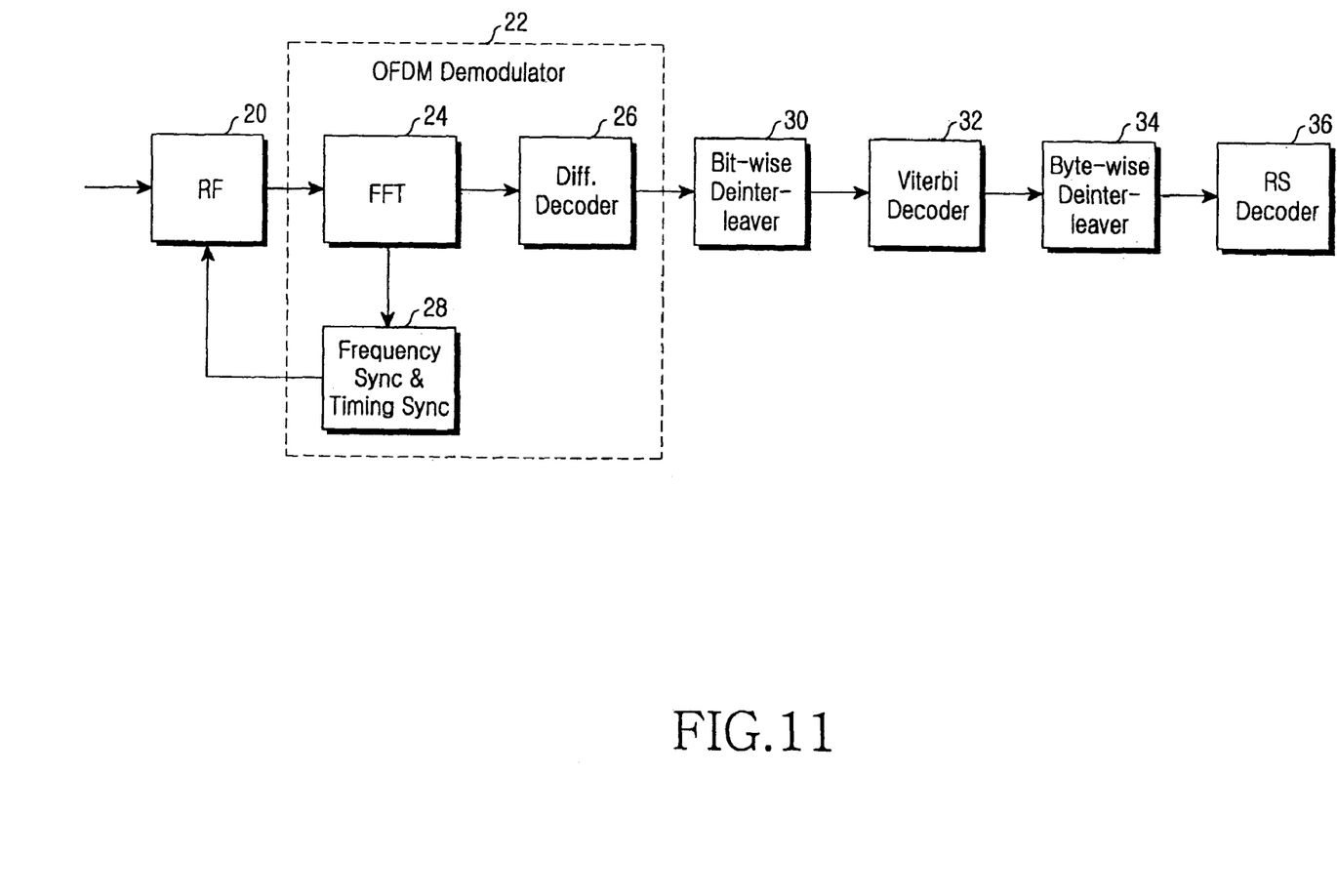
FIG. 11 is a block diagram illustrating an internal structure of a terminal for processing a broadcasting signal received from a gap filler according to an embodiment of the present invention.

FIG. 11 is a block diagram illustrating an internal structure of a terminal for processing a broadcasting signal received from a gap filler according to an embodiment of the present invention. Referring to FIG. 11, an RF unit 20 receives cyclic-delayed signals, acquires diversity gain for the received signals, and down-converts the received signals into baseband signals. An FFT unit 24 performs FFT on the received baseband signals. The FFT unit 24 can demodulate the signals that were IFFT-modulated in a transmitter before being transmitted. Generally, signals in a partial band may be considerably distorted due to an influence of a wireless channel. In this case, partial signals in the output of the FFT unit 24 can be distorted. However, application of the cyclic delay diversity proposed in the present invention can prevent the distortion.

The signals FFT-modulated by the FFT unit 24 are decoded by a differential decoder 26. The decoded signals are provided to a Reed-Solomon (RS) decoder 36 through a bit deinterleaver 30, a Viterbi decoder 32, and a bytewise deinterleaver 34, and the RS decoder 36 performs error correction on the decoded signals. Herein, the Viterbi decoder 32 and the RS decoder 36 are concatenated in order to provide powerful burst error correction. The connection of the cyclic delay diversity with the channel coding can increase a reception capability of the terminal.

As can be understood from the foregoing description, a DMB gap filler according to the present invention transmits transmission signals using the cyclic delay diversity modulation scheme, thereby preventing performance degradation occurring in the blanket area for terrestrial DMB service. In addition, with the use of the cyclic delay diversity modulation scheme, the gap filler can reduce ISI and ICI, and maximize frequency diversity.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A gap filler apparatus for providing cyclic delay diversity in a digital multimedia broadcasting (DMB) system, comprising:
    a receiver for receiving an orthogonal frequency division multiplexing (OFDM) signal transmitted as a broadcasting signal;
    a symbol synchronization unit for acquiring symbol synchronization of the OFDM signal using a predetermined number of stored initial symbols of the OFDM signal, detecting a guard interval of an OFDM symbol using the symbol synchronization, determining a sample length by which the OFDM symbol is cyclic-delayed within the guard interval, storing a sample of the determined length from a symbol synchronization time, cyclic-delaying the OFDM signal by the determined sample length without the sample of the determined length, and adding the sample of the determined length to a last part of the cyclic-delayed OFDM symbol;
    an amplifier for amplifying the cyclic-delayed OFDM signal; and
    a transmitter for transmitting the amplified OFDM signal to a wireless network.

2. The gap filler apparatus of claim 1, wherein the symbol synchronization unit comprises:
    an analog-to-digital (A/D) converter for converting the OFDM signal into a digital signal; and
    a buffer for storing a portion of the received OFDM signal in units of the determined length.

3. The gap filler apparatus of claim 2, wherein the symbol synchronization unit further comprises:
    a timing controller that determines the sample length, and stores in the buffer, the sample of the determined length from the symbol synchronization time.

4. The gap filler apparatus of claim 1, wherein the symbol synchronization unit comprises:
    an A/D converter for converting the OFDM signal into a digital signal; and
    a buffer for buffering the predetermined number of initial OFDM symbols in the received OFDM signal, and continuously buffering the sample of the determined length from the guard interval of each of the OFDM symbols;
    a symbol synchronizer for acquiring the symbol synchronization from the predetermined number of initial OFDM symbols;
    a multiplexer for multiplexing an output of the A/D converter and an output of the buffer; and
    a timing controller for controlling the buffer, and controlling the multiplexer to add the sample of the determined length to the last part of the corresponding OFDM symbol.

5. A method for providing cyclic delay diversity in a gap filler including a receiver and a symbol synchronization unit for a digital multimedia broadcasting (DMB) system, the method comprising:
    receiving, by the receiver, an orthogonal frequency division multiplexing (OFDM) signal transmitted as a broadcasting signal;
    acquiring symbol synchronization of the received OFDM signal by the symbol synchronization unit using a predetermined number of stored initial symbols of the OFDM signal;
    detecting a guard interval of an OFDM symbol using the acquired symbol synchronization;
    determining a sample length by which the OFDM symbol is cyclic-delayed within the guard interval;
    storing a sample of the determined length from a symbol synchronization time;
    cyclic-delaying the OFDM signal by the determined sample length without the sample of the determined length; and
    adding the sample of the determined length to a last part of the cyclic-delayed OFDM symbol.

6. The method of claim 5, wherein the step of determining a sample length comprises the steps of
    converting the OFDM signal into a digital signal; and
    buffering a portion of the received OFDM signal in units of the sample length.

7. The method of claim 6, wherein the buffering step comprises buffering a sample of the determined length from-a the symbol synchronization time.

8. The method of claim 5, wherein the step of cyclic-delaying the OFDM signal comprises
    excluding data corresponding to the sample length from a start time of the guard.

9. The method of claim 5, wherein the step of determining the sample length comprises the steps of:
    converting the received OFDM signal into a digital signal;
    continuously buffering a sample of the determined length from the guard interval of the OFDM symbol;
    excluding data corresponding to the sample length from a start time of each guard interval in the received OFDM signal; and
    adding the buffered sample to a last part of the corresponding OFDM symbol.

10. A broadcasting relay network for transmitting a broadcasting signal to a terminal in a digital multimedia broadcasting (DMB) system, comprising a plurality of gap fillers,
    wherein each of the gap fillers comprises:

a receiver for receiving an orthogonal frequency division multiplexing (OFDM) signal transmitted as the broadcasting signal;

a symbol synchronization unit for acquiring symbol synchronization of the OFDM signal using a predetermined number of stored initial symbols of the OFDM signal, detecting a guard interval of an OFDM symbol using the symbol synchronization, determining a sample length by which the OFDM symbol is cyclic-delayed within the guard interval, storing a sample of the determined length from a symbol synchronization time, cyclic-delaying the OFDM signal by the determined sample length without the sample of the determined length, and adding the sample of the determined length to a last part of the cyclic-delayed OFDM symbol;

an amplifier for amplifying the cyclic-delayed OFDM signal; and a transmitter for transmitting the amplified OFDM signal to a wireless network.

11. The broadcasting relay network of claim 10, wherein the gap fillers are classified into tiers according to their respective distance from the terminal.

12. The broadcasting relay network of claim 11, wherein gap fillers belonging to different tiers cyclic-delay the received OFDM signal by different sample lengths within the guard interval before transmission.

13. The broadcasting relay network of claim 10, wherein the symbol synchronization unit comprises:

an analog-to-digital (A/D) converter for converting the OFDM signal into a digital signal; and a buffer for storing a portion of the received OFDM signal in units of sample the determined length.

14. The broadcasting relay network of claim 13, wherein the symbol synchronization unit further comprises a timing controller for determining the sample length and storing, in the buffer, the sample of the determined length from the symbol synchronization time.

15. The broadcasting relay network of claim 10, wherein the symbol synchronization unit excludes data corresponding to the sample length from a start time of each guard interval.

* * * * *